US012557913B2

(12) United States Patent
Knabe

(10) Patent No.: US 12,557,913 B2
(45) Date of Patent: Feb. 24, 2026

(54) BEDSTEAD

(71) Applicant: Sven Knabe, Gummersbach (DE)

(72) Inventor: Sven Knabe, Gummersbach (DE)

(73) Assignee: SINO INTERNATIONAL GROUP LTD, Tsim Sha Tsui (HK)

( * ) Notice: Subject to any disclaimer, the term of this patent is extended or adjusted under 35 U.S.C. 154(b) by 0 days.

(21) Appl. No.: 18/788,423

(22) Filed: Jul. 30, 2024

(65) Prior Publication Data

US 2025/0082105 A1     Mar. 13, 2025

(30) Foreign Application Priority Data

Sep. 12, 2023    (DE) .......................... 102023124554.6

(51) Int. Cl.
| | |
|---|---|
| *A47C 17/16* | (2006.01) |
| *A47C 19/00* | (2006.01) |
| *A47C 20/04* | (2006.01) |
| *A47C 21/02* | (2006.01) |
| *F16B 12/48* | (2006.01) |

(52) U.S. Cl.
CPC .......... *A47C 17/162* (2013.01); *A47C 19/005* (2013.01); *A47C 20/041* (2013.01); *A47C 21/026* (2013.01); *F16B 12/48* (2013.01)

(58) Field of Classification Search
CPC ... A47C 17/162; A47C 19/005; A47C 20/041; A47C 21/026; A47C 19/025; A47C 20/04; A47C 21/06; A47C 23/04; A47C 23/00; A47C 19/122; A47C 19/02; A47C 19/021; A47C 19/024; A47C 27/04; A47C 31/023
USPC .......................................... 5/236.1, 239, 244
See application file for complete search history.

(56) References Cited

U.S. PATENT DOCUMENTS

| | | | | | |
|---|---|---|---|---|---|
| 3,967,331 | A | * | 7/1976 | Glassman | .............. A47C 23/30 5/244 |
| 7,832,040 | B2 | * | 11/2010 | Constantinescu | .... A47C 19/021 5/241 |
| 2013/0067659 | A1 | * | 3/2013 | Oh | ......................... A47C 19/12 5/400 |

* cited by examiner

*Primary Examiner* — J. T. Newton
(74) *Attorney, Agent, or Firm* — Andrew Wilford

(57) ABSTRACT

A beadstead has a circumferential main outer frame, a dimensionally stable support element attached or attachable to the main outer frame, a cover surrounding the main outer frame and the support element and having outer edges, a multipart and profiled circumferential retaining strip wrapped by the edges of the cover that are folded over and project beyond the retaining strip for fixation under the retaining strip. The retaining strip extend transversely to a plane of the support and having a first leg projecting parallel to the support, spaced from the plane, and extending below the support. Clips fastened to the outer edges of the cover fit on the first leg to secure the edges to the frame in a desired position.

20 Claims, 1 Drawing Sheet

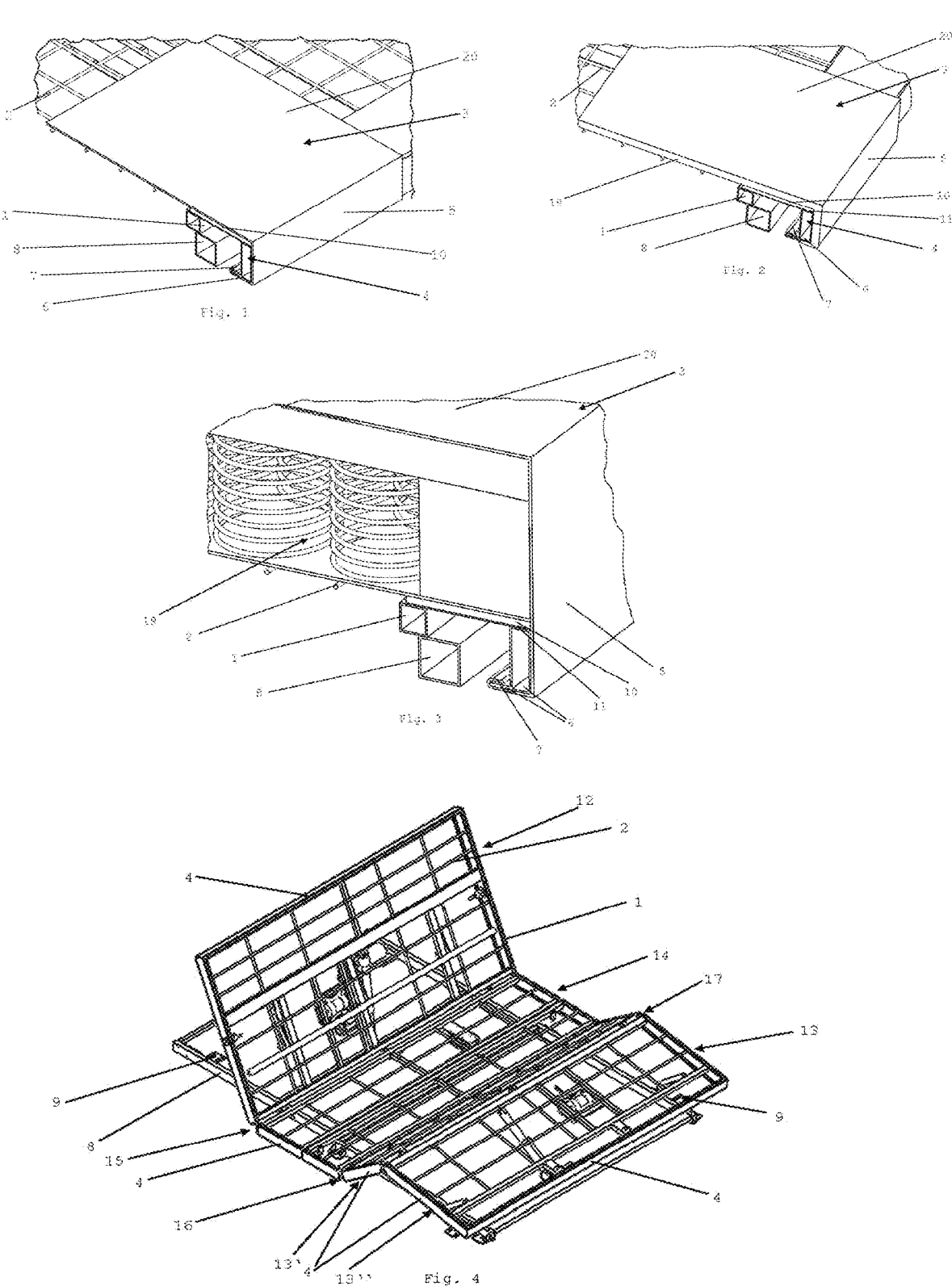

BEDSTEAD

FIELD OF THE INVENTION

The present invention relates to a bedstead. More particularly this invention concerns a bed frame as can be used in a convertible couch.

BACKGROUND OF THE INVENTION

A typical beadstead has a circumferential main outer frame, a dimensionally stable support element fastened or fastenable to the main outer frame, a cover surrounding the main outer frame and the support element and a multipart circumferential retaining strip wrapped by edges of the cover. The cover edges are folded over with their free outer edges projecting beyond the retaining strip and fixed on the lower edge panel to parts of the retaining strip.

In the prior art, such a beadstead is known in particular as a base for a box-spring bed. The surrounding frame that is usually rectangular or square, preferably is a hollow profile made of metal, and a support element, such as a metal rod or grid, is attached to the frame part and forms a support surface for a corresponding support or mattress. In an initial position, the support element lies in a support plane that is parallel to and spaced from the installation plane of the beadstead. Starting approximately from this support plane, a retaining strip with a certain width extends parallel to the support plane. In the longitudinal direction, the retaining strip follows the main outer frame. The retaining strip is several parts and is made of wood. For example, one part of the retaining strip is at the head and foot end of the beadstead and one part of the slat is on each side of the frame. The parts meet at the corners of the beadstead. This results in an all-round tension strip. Bed feet can also be attached to the frame section.

A cover that can be a textile cloth, for example, is stretched over the frame part and the support element and retaining strip and attached to the retaining strip at its outer edges. The cover is placed on the support element, with the edges projecting laterally over the support element and outwardly covering the visible area of the retaining strip. The outer edges of the cover are attached to the lower edge panel of parts of the retaining strip. On the lower edge panel means that the attachment is made underneath the beadstead, i.e. in an area of the beadstead facing the installation plane and therefore in an area that is no longer visible later. The end sections are attached to the tensioning bar by staples. In this way, the substructure of the beadstead is covered by the cover.

One disadvantage of fastening with staples is that creases appear in the visible area of the edges when the end sections are fastened to the tension strip. The fastening method is also time-consuming because the fabric has to be pulled smoothly over the tension strip and held taut to insert the staples.

Another disadvantage of this fastening method is that once a cover has been attached to the retaining strip, it cannot be removed without damaging or destroying the cover. If the cover becomes defective or dirty at a later date, it cannot be replaced or washed.

OBJECTS OF THE INVENTION

It is therefore an object of the present invention to provide an improved bedstead.

Another object is the provision of such an improved bedstead that overcomes the above-given disadvantages, in particular that has a nondestructively detachable cover, and the beadstead should be particularly easy and inexpensive to manufacture.

SUMMARY OF THE INVENTION

A beadstead has according to the invention a circumferential main outer frame, a dimensionally stable support element attached or attachable to the main outer frame, a cover surrounding the main outer frame and the support element and having outer edges, a multipart and profiled circumferential retaining strip wrapped by the edges of the cover that are folded over and project beyond the retaining strip for fixation under the retaining strip. The retaining strip extends transversely to a plane of the support and having a first leg projecting parallel to the support, spaced from the plane, and extending below the support. Clips fastened to the outer edges of the cover fit on the first leg to secure the edges to the frame in a desired position.

Profiles can be produced particularly cheaply and easily, for example by rolling or continuous casting, and a large number of profiles are available. The profile is aligned in its longitudinal direction of the frame part and is attached all around the beadstead, preferably to the frame part. The profile also extends transversely to the support plane of the support element, i.e. perpendicular to the installation plane of the beadstead. One leg of the profile is parallel to the support element or its support plane and extends below the support element and therefore into the space between the support plane (floor) and the support plane, behind the retaining strip, so that the clips that are attached to the leg in the use position are not visible. The clips firmly secure the cover onto the frame and hold it in place. The clips make it quick and easy to attach the cover to the retaining strip and also to remove it afterward without damaging it. The cover can be washed or replaced without having to repair the entire beadstead.

Preferably, the support element and the retaining strip as well as the cover are attached to the main outer frame, and the beadstead has a secondary frame to which the main outer frame is attached or can be attached.

The secondary frame provides improved stability for the beadstead. In addition, base frames for attaching bed legs can be provided on the secondary frame, with which the beadstead is placed on the floor. If the main outer frame has movable parts or sections, the movable parts can be attached to the secondary frame by hinges or articulated levers and can be supported thereon and adjusted relative to the secondary frame, while the secondary frame stands or lies rigidly on the set-up plane.

Preferably, the secondary frame can have a base frame and bed legs that can be attached or fixed to it.

Depending on the material from which the retaining strip is made, various fastening methods are suitable, and it is particularly preferable that the main outer frame, the secondary frame and the support element are made of metal and that the retaining strip is a metal profile.

In this particularly preferred case, all parts are made of metal and can be joined together in a cost-effective and durable manner, for example by welding.

Alternatively, the retaining strip can be a plastic profile. Plastic profiles can also be produced particularly easily and cost-effectively. A connection to the frame part can then be made by screwing, for example.

It is also preferable that the clips are strip-like grippers with an approximately U-shaped cross-section.

The U-shape enables the clip to be quickly and easily snapped onto the leg, while the strip-like shape of the gripper ensures improved retraction so that wrinkling at the edges of the cover is prevented.

It is preferable that the clips are plastic profiles.

Such profiles can be produced easily and cost effectively, e.g. as extrusion profiles.

Preferably, the clips are sewn onto the end sections of the cover to ensure a permanent and stable fastening.

It is preferable that the retaining strip is a hollow profile with a square or rectangular cross-section and a leg directed parallel to the support element extends toward and under the support element, this leg being spaced from the support plane.

The profile is attached to the beadstead and aligned in such a way that an extended first leg is parallel to and spaced from the support element. The other legs are then aligned automatically due to the rectangular or square cross-section, and a second leg is also parallel to the first leg and two further legs are aligned transverse to the support plane of the support element.

Such profiles are particularly dimensionally stable, which is advantageous as the cover is slipped onto the frame and clipped to the legs by clips under tension, and corresponding forces act on the leg and the entire retaining strip.

Alternatively, the retaining strip can be an L-profile, a U-profile or a C-profile, and at least one leg is directed parallel to the support element toward and under the support element and at least one other leg is directed transverse to the support plane These profiles are also particularly easy and inexpensive to manufacture.

Preferably, preferably circumferential reinforcing or stiffening strip of metal or plastic is attached to the frame part to laterally extend the support element, with the stiffening strip and the support element being in the same plane so that the upper faces of the stiffening strip and the support element facing away from the bed's set-up plane form a common flat support surface.

The stiffening strip is used to extend the support surface of the support section. For example, upholstered parts can be placed on the stiffening strip. It is essential that the support element and the strip are attached to the frame part in such a way that they form a single common support surface. In a particularly preferred embodiment, the strip and all parts of the beadstead are made of metal so that they can be joined together in a cost-effective and durable manner by welding.

It may be particularly preferable for the retaining strip to have a further leg with which the retaining strip is attached to the main frame, the further leg being the strip with which the retaining strip is attached to the main frame.

It is preferably provided that the frame part and the support element and retaining strip are subdivided into a movable head section, a movable foot section and a stationary middle section, the frame part being s firmly fixed with its middle section to the secondary frame, preferably welded or screwed, and the head section and the foot section being movable relative to the secondary frame, the edges of the cover in first hinge regions between the middle section and the head section and in second hinge regions between the middle section and the foot section each having a slit subdividing the edges into edge sections, a clip being fastened to each such edge section.

This design allows the entire beadstead covered with the cover to be moved. The beadstead therefore retains its attractive appearance, even when the head section and/or foot section are adjusted, because the cover is held on the moving parts of the frame and simply moves with it. The edges are subdivided into edge sections by slots, to each of which a clip is attached to allow the corresponding movement.

It may preferably be provided that the foot section has two subsections that can be moved relative to one another, the edge section of the foot section having a slot in a third hinge region between the subsections that subdivide edge regions into further subsections, a clip being attached to each section.

The head section and the foot section or foot subsections are preferably movable electrically in order to increase comfort. Electric drives are mounted underneath the movable parts in a known manner and are designed for connection to power.

Optionally, it is preferable for the cover to be a fabric covering made of textile or leather or a combination of these materials. In a simple embodiment, it is placed directly on the support element.

In addition, the cover can be quilted with a foam layer that is between the cover and the support element, and the foam layer can, for example, serve to protect the cover.

Alternatively, it may preferably be provided that the cover is a film.

It is particularly preferred that upholstery is placed on the support element and/or the strip, the upholstery preferably being a mattress with a pocket spring core structure, and the support element and the upholstery being covered by the cover.

This is a particularly convenient design. The cover holds the upholstery on the support element in its intended position and prevents the upholstery from slipping. A further mattress can then be placed on the cover that can also have a pocket spring core structure. Well-known foam mattresses can also be placed on top.

In addition, it is preferably provided that the cover is a generally cubical cover, with an upper face panel that is stretched over at least the support element and a part of the frame part, with side-edge panels of the cubical cover covering a part of the frame part and the retaining strip and extending to the outer edges where the clips are attached by being slipped onto the legs and with which the cover is held in the desired position, and with a lower edge panel that has a square or rectangular opening framed by the outer edges and the clips attached thereto.

The opening is provided so that the cover can be pulled over the parts of the beadstead to be covered. The cover can then be aligned accordingly and fixed to the leg under tension using the clips.

It may preferably be provided, that further upholstery, preferably a mattress with a spring core structure, is placed or can be placed on the support element.

An additional topper can be placed on top of the upholstery to further improve lying comfort.

BRIEF DESCRIPTION OF THE DRAWING

The above and other objects, features, and advantages will become more readily apparent from the following description, reference being made to the accompanying drawing in which:

FIG. 1 is a section of a first beadstead according to the invention;

FIG. 2 is a section of a second beadstead according to the invention;

FIG. 3 is a section of a third beadstead according to the invention; and

FIG. 4 is perspective view of a beadstead without cover.

SPECIFIC DESCRIPTION OF THE INVENTION

As seen in the drawing, beadsteads according to the invention all have a circumferential main outer frame 1, a dimensionally stable support element 2 attached to the main outer frame 1 and a cover 3 shown partially in FIGS. 1-3 and at least partially surrounding the main outer frame 1 and the support element 2. In addition, a multipart circumferential retaining strip 4 is provided that is wrapped by edges 5 of the cover 3. The edges 5 are folded over with their free outer edges projecting beyond the retaining strip 4 and are fixed on the lower edge panel to parts of the retaining strip 4.

The circumferential main outer frame 1 is a hollow metal profile of square cross-section to which the support element 2 in the form of a metal grid is attached. The square cross-sectional shape of the main outer frame 1 allows the support element 2 to be welded onto a respective leg of the main outer frame 1. A retaining strip 4 is attached to a circumferential metal stiffening strip 10 that is also placed on the leg of the main outer frame 1 and welded to it. The stiffening strip 10 and the metal grid form a common support plane.

In FIGS. 1 to 3, a cover 3 that can be a fabric cloth, for example, is stretched over the main outer frame 1 and the support element 2 and retaining strip 4 and is attached to the retaining strip 4 with clips 7 that are attached to the edges of the fabric cloth (cover 2).

The retaining strip 4 is a hollow metal profile with an essentially rectangular cross-section. The hollow profile (retaining strip 4) is aligned longitudinally with the main outer frame 1 and is circumferentially attached to the main outer frame 1. It extends transversely to the support plane of the support element 2 and has a first leg 6 projecting parallel to the support element 2 and spaced from the support plane and extending below the support element 2. The clips 7, which are attached to the edges of the cover 3 in order to clip the cover 3 to the frame, hold it in place, and attach it to the first leg 6. By attaching the clips 7 to the first leg 6, the cover 3 can be quickly and easily attached to the retaining strip 4. The clips 7 can be removed from the first leg 6 just as easily in order to remove the cover 3 from the frame and, for example, to wash or replace it.

The clips 7 are strip-like grippers of an approximately U-shaped cross-section and can be produced cost effectively of plastic by continuous casting. The U-shape enables the clip 7 to be slipped onto the leg 6 so that the strip-like shape of the clip 7 ensures improved insertion, i.e. prevents creasing at the edge 5 of the cover 3. The clips 7 are sewn onto the edges of the cover 3, ensuring a permanent and stable attachment.

FIG. 4 shows a secondary frame 8 with a base frame 9 and legs attached to it, the main outer frame 1 being attached to the secondary frame 8. The secondary frame 8 provides improved stability to the beadstead. If the main outer frame 1 has movable parts, as shown in FIG. 4, they can be attached to the secondary frame 8 by hinges or articulated levers for pivotal positioning relative to the secondary frame 8.

The main outer frame 1, the secondary frame 8 and the support element 2 are made of metal. This means that all parts can be joined together cost effectively and permanently by welding.

The stiffening strip 10 is as an extension of the support element 2. For example, upholstered parts can be mounted on the stiffening strip 10 as shown in FIG. 3. It is essential that the support element 2 and the stiffening strip 10 are attached to the main outer frame 1 in such a way that they form a flat support surface.

FIG. 4 shows a beadstead without a cover that has movable sections. For this purpose, the main outer frame 1 and the support element 2 and the retaining strip 4 form a movable head section 12, a movable foot section 13 and a fixed middle section 14. The main outer frame 1 is firmly welded to its middle section 14 to the secondary frame 8, the head section 12 and the foot section 13 being movable relative to the secondary frame 8.

The edges 5 of the cover 3 have slits in first hinge areas 15 between the middle section 14 and the head section 12 and in second hinge areas 16 between the middle section 14 and the foot section 13 that separate the frames. A clip is attached to each edge section. The foot section is subdivided into two further subsections 13' and 13". This design allows all parts of the beadstead covered with the cover 3 to be moved relative to one another. The beadstead therefore retains its attractive appearance even when the head section 12 and/or foot section 13 are moved, because the cover 3 is held on the moving parts and moves with them. The clips 7 are not highly elastic so they must be cut through in the hinge areas 15, 16, 17 to allow this movement. The head section 12 and the foot section 13 or the foot subsections 13' and 13" are adjusted electrically for ease of use. Electric drives can be seen in FIG. 4 below the head section 12 and below the foot section 13.

In a simple embodiment, the cover 3 is placed directly on the support element 2 as shown in FIG. 1. FIG. 2 shows an embodiment in which the cover 3 is also quilted with a foam layer 18 between the cover 3 and the support element 2, the foam layer 18, for example, serving as protection for the cover 3. FIG. 3 shows an embodiment in which a spring mattress 19 is placed on the support element 2 and/or the stiffening strip 10, with the support element 2 and the upholstery being overlain by the cover 3. A further spring mattress, on which a topper is placed, can be placed on the support element 2. This structure is known per se for a box-spring bed.

The cover 3 is preferably generally cubical, with an upper face panel 20 that is stretched at least over the support element 2 and a part of the main outer frame 1, edges 5 as side-edge panels of the cubical cover that cover a part of the main outer frame 1 and the retaining strip 4 and to the outer edges of which the clips 7 are attached to the legs 6 and with which the cover 3 is held in the desired position and with an lower edge panel that has a square or rectangular opening framed by the outer edges and the clips 7 attached thereto. The opening is provided so that the cover 3 can be pulled over the parts of the beadstead to be covered and aligned. The cover 3 is then fixed to the leg 6 under tension using the clips 7.

The invention is not limited to the illustrated embodiments, but is variable in many ways within the scope of the disclosure.

All individual and combination features disclosed in the description and/or drawing are considered to be essential to the invention.

The invention claimed is:

1. A beadstead comprising:
   a circumferential main outer frame;
   a dimensionally stable support element attached or attachable to the main outer frame;

a cover at least partially surrounding the main outer frame and the support element and having outer edges;

a multipart and profiled circumferential retaining strip wrapped by the edges of the cover that are folded over and project beyond the retaining strip for fixation under the retaining strip, the retaining strip extending transversely to a plane of the support and having a first leg projecting parallel to the support, spaced from the plane, and extending below the support; and clips fastened to the outer edges of the cover that fit on the first leg in a desired position.

2. The beadstead according to claim 1, wherein the support element, the retaining strip, and the cover are fastened to the main outer frame, the beadstead further comprising:

a secondary frame to which the main outer frame is fastened or can be fastened.

3. The beadstead according to claim 2, wherein the secondary frame has a base frame and bed feet are attachable thereto.

4. The beadstead according to claim 2, wherein the main outer frame, the secondary frame and the support element are made of metal.

5. The beadstead according to claim 1, wherein the retaining strip is a metal profile.

6. The beadstead according to claim 1, wherein the retaining strip is a plastic profile.

7. The beadstead according to claim 1, wherein the clips are strip-like grippers with of U-shaped cross-section.

8. The beadstead according to claim 1, wherein the clips are elongated plastic profiles of uniform section.

9. The beadstead according to claim 1, wherein the clips are sewn onto the outer edges of the cover.

10. The beadstead according to claim 1, wherein the retaining strip is a hollow profile with a square or rectangular cross-section, the first leg extending toward and under the support element and spaced from the support plane.

11. The beadstead according to claim 1, wherein the retaining strip is an L-profile, a U-profile or a C-profile, the first leg being directed toward and under the support element, the retaining strip having at least one second leg directed transversely to the support plane.

12. The beadstead according to claim 1, further comprising:

a stiffening strip made of metal or plastic attached to the main outer frame, and extending outward from the support element, the stiffening strip and the support element being in one plane so that a face of the stiffening strip directed away from the support plane of the beadstead and the support element forms a common flat support surface.

13. The beadstead according to claim 1, wherein the retaining strip has a second leg that attaches the retaining strip the main outer frame, the second leg being part of the retaining strip and serving for securing the retaining strip to the main outer frame.

14. The beadstead according to claim 1, wherein the main outer frame and the support element and the retaining strip are subdivided into a movable head section, a movable foot section and a fixed middle section, the main outer frame being firmly fixed to the middle section of the secondary frame, the head section and the foot section being movable relative to the secondary frame, the outer edges of the cover having slots in first hinge regions between the middle section and the head section and in second hinge regions between the middle section and the foot section that subdivide the edges into edge sections, a respective one of the clips being fastened to each edge section.

15. The beadstead according to claim 14, wherein the foot section has two subsections movable relative to one another, the edge section of the foot subsection having a slot in a third hinge region between the subsections that subdivide the edge region into further sections, a respective one of the clips being fastened to each section.

16. The beadstead according to claim 15, wherein the head section and the foot section or the foot subsections are electrically movable.

17. The beadstead according to claim 1, wherein the cover is a cloth covering made of textile or leather or a combination of these materials.

18. The beadstead according to claim 1, further comprising:

upholstery on the support element and/or the retaining strip, the support element and the mattress being covered by the cover.

19. The beadstead according to claim 1, wherein the cover is cubical with an upper face panel stretched over at least the support element and a part of the main outer frame, the outer edges being side-edge panels of the cubical cover that cover a part of the main outer frame and the retaining strip and extend to the outer edges where the clips are fastened and attached to the legs to hold the cover in the desired position, a lower edge panel of the cover having a square or rectangular opening framed by the outer edges and the clips fastened thereto.

20. The beadstead according to claim 1, further comprising:

a mattress with a spring core structure on the support element.

* * * * *